(12) United States Patent
Ishibashi

(10) Patent No.: US 8,723,367 B2
(45) Date of Patent: May 13, 2014

(54) POWER SUPPLY SYSTEM

(75) Inventor: Atsuhiko Ishibashi, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 472 days.

(21) Appl. No.: 13/011,526

(22) Filed: Jan. 21, 2011

(65) Prior Publication Data

US 2011/0181119 A1 Jul. 28, 2011

(30) Foreign Application Priority Data

Jan. 28, 2010 (JP) .................................. 2010-016483

(51) Int. Cl.
*H01F 37/00* (2006.01)

(52) U.S. Cl.
USPC .......... 307/104; 455/41.1; 323/355; 323/247; 323/251; 323/255; 323/259; 323/258; 323/359; 363/21.7; 363/21.9; 363/21.12; 363/97; 363/95

(58) Field of Classification Search
USPC .......... 307/104; 323/355, 258, 247, 251, 255, 323/256, 358, 359; 363/20, 21.01, 21.04, 363/95, 97, 131; 455/41.1
See application file for complete search history.

(56) References Cited

U.S. PATENT DOCUMENTS

| | | | |
|---|---|---|---|
| 6,239,879 B1 | 5/2001 | Hay | |
| 7,054,169 B2 * | 5/2006 | Huh et al. ................... | 363/21.16 |
| 7,233,137 B2 * | 6/2007 | Nakamura et al. ............ | 323/355 |
| 7,800,518 B2 | 9/2010 | Miwa | |
| 8,030,887 B2 | 10/2011 | Jung | |
| 2012/0040613 A1 * | 2/2012 | Nakano ........................ | 455/41.1 |

FOREIGN PATENT DOCUMENTS

| | | |
|---|---|---|
| JP | 6-325229 A | 11/1994 |
| JP | 2000-058356 | 2/2000 |
| JP | 2005-151075 A | 6/2005 |
| JP | 2007-140903 A | 6/2007 |
| JP | 2007-189520 A | 7/2007 |
| JP | 2009-124895 A | 6/2009 |
| JP | 2009-201344 A | 9/2009 |
| JP | 2009247137 A | 10/2009 |

OTHER PUBLICATIONS

Japanese Office Action with English translation issued in Japanese Application No. 2010-016483 dated Sep. 17, 2013.

* cited by examiner

*Primary Examiner* — Jared Fureman
*Assistant Examiner* — Jagdeep Dhillon
(74) *Attorney, Agent, or Firm* — McDermott Will & Emery LLP

(57) ABSTRACT

In a power supply system, reducing influence of a noise etc., optimal electric power is supplied corresponding to power consumption of a receiving side load, and power consumption is decreased greatly. When a potential difference detector 12 detects that a power supply voltage of the receiving side load is decreased lower than a lower limit voltage threshold or increased higher than an upper limit voltage threshold, a burst interval setting unit sets up a burst signal of a pulse width corresponding to the detection result. A burst signal generator generates a burst signal based on the setup, and excites a control primary inductor. A burst signal detector generates a pulse signal in response to electromotive force of a control secondary inductor. A pulse width controller determines increase or decrease of the voltage value of the receiving side load from a no-signal period of a pulse signal, measured by a no-signal period measuring unit, and modifies and outputs a signal outputted by a alternating current generator so as to change a period or the number of times to excite a power primary inductor.

5 Claims, 12 Drawing Sheets

POWER SUPPLY SYSTEM

CROSS REFERENCES TO RELATED APPLICATIONS

The disclosure of Japanese Patent Application No. 2010-16483 filed on Jan. 28, 2010 including the specification, drawings and abstract is incorporated herein by reference in its entirety.

BACKGROUND OF THE INVENTION

The present invention relates to non-contact electric power supply technology, in particular, to technology which is effective in control of the electric power supply corresponding to power consumption of a receiving side load.

When electrifying parts, such as an ink cartridge of a printer, which are exchanged frequently, there is a risk of causing a poor contact due to wear-out and corrosion of electrodes or due to a pinched dust. Therefore, technology in which communication and electric power supply, etc., from the printer body to the ink cartridge are performed in a non-contact manner is adopted widely.

Such a non-contact electric power supply technology includes technology in which for example, inductors facing each other are arranged between the printer body and the ink cartridge, a current change is generated and passed through a primary winding, and an alternating-current voltage induced across both ends of a secondary winding is rectified through a diode bridge, and the obtained direct-current voltage is supplied to the ink cartridge (refer to Patent Document 1).

(Patent Document 1) Japanese Patent Laid-open No. 2000-58356.

SUMMARY OF THE INVENTION

However, the present inventors have found out that there are the following problems in the non-contact electric power supply technology described above.

That is, when the electric power is coupled in a non-contact manner, transmission efficiency changes depending on the distance and state of the coupling; accordingly, it is necessary to transmit electric energy excessively. As a result, surplus electric power after the electric power is consumed by the receiving side will be abandoned, posing a problem that the power consumption will increase.

If the power consumption in the receiving side of the power is fed back and power transmission amount from the transmitting side can be controlled, it will become unnecessary to transmit the power excessively. However, since the magnetic field coupling transmits only a current change and cannot transmit a voltage level of '0' (Lo) and '1' (Hi), it is difficult to transmit, by the magnetic field coupling, three kinds of feedbacks notifying that the transmission power is short/excess/proper in amount.

In Patent Document 1, a new inductor is faced each other, and the communication to the printer body is formed such that a low frequency alternating current transmits '0' and a high frequency alternating current transmits '1', and '0' and '1' are demodulated. However, the technology which distinguishes the communication as '0' and '1' by a difference of frequency of the alternating current signal passing through the inductor has the problem that it is not easy to distinguish the communication as being different from a waveform of a resonance or a noise.

Consequently, there is a possibility of demodulating '0' and '1' erroneously, and when this communication technology is used for a transmission control of the amount of electric power, there arises a risk that the control will become impracticable.

The purpose of the present invention is to provide a non-contact electric power supply technology which can reduce power consumption greatly, by reducing influence of a noise etc., and by supplying optimal electric power corresponding to power consumption of a receiving side load.

The above and other purposes and new features will become clear from description of the specification and the accompanying drawings of the present invention.

The following explains briefly an outline of typical inventions to be disclosed by the present application.

The present invention provides a power supply system comprising a power transmitting unit which transmits electric power and a power receiving unit which receives the electric power transmitted from the power transmitting unit and supplies the electric power to a receiving side load. The electric power transmitted from the power transmitting unit is received in a non-contact manner and supplied to the receiving side load coupled to the power receiving unit. The power receiving unit generates a burst signal notifying that the electric power is short or surplus when the electric power of the receiving side load becomes short or surplus, and the power transmitting unit controls the increase and decrease of the electric power to be transmitted to the power receiving unit, based on a signal interval of the burst signal generated by the power receiving unit.

The present invention provides also a power supply system in which the power receiving unit comprises a power secondary inductor which generates electromotive force in response to a magnetic field change; a rectifier which converts into a DC (direct-current) voltage an AC (alternating-current) voltage induced across both ends of the power secondary inductor; a power-receiver voltage controller which measures a level of the voltage outputted from the rectifier and supplied to the receiving side load, and outputs the burst signal after controlling an interval at which the burst signal is outputted depending on the measured voltage level; and a control primary inductor which is excited based on the burst signal generated by the power-receiver voltage controller. Furthermore, the power transmitting unit of the power supply system comprises a power primary inductor which is excited based on an AC signal; a control secondary inductor which generates electromotive force in response to a magnetic field change of the control primary inductor; and a power-transmitter voltage controller which detects the burst signal from an AC signal induced across both ends of the control secondary inductor, determines whether the electric power of the receiving side load is short or surplus by measuring an output interval from the detected burst signal, and controls the increase and decrease of the power to be transmitted to the power receiving unit by controlling the AC signal to be supplied to the power primary inductor.

Furthermore, the present invention provides a power supply system in which the power-receiver voltage controller comprises a voltage detector which detects whether the voltage level outputted from the rectifier and supplied to the receiving side load is lower than a lower limit voltage threshold, or higher than an upper limit voltage threshold higher than the lower limit voltage threshold, or within the limits of a reference voltage between the lower limit voltage threshold and the upper limit voltage threshold; a burst interval setting unit which sets up an interval at which the burst signal is outputted, based on the voltage level detected by the voltage detector; and a burst signal generator which generates and outputs the burst signal at the interval set up by the burst interval setting unit. Furthermore, the power-transmitter voltage controller of the power supply system comprises a burst signal detector which detects transmission of the burst signal, based on an AC signal induced across both ends of the control secondary inductor; an interval measuring unit which measures an output interval of the burst signal detected by the burst signal detector; and a controller which determines whether the electric power of the receiving side load is short or surplus, based on the output interval of the burst signal measured by the interval measuring unit, and the controller controls the AC signal to be supplied to the power primary inductor by changing a period or the number of times to excite the power primary inductor.

An outline of another invention of the present application is described briefly in the following.

The present invention provides a power supply system in which the power receiving unit comprises a power secondary inductor which generates electromotive force in response to a magnetic field change; a rectifier which converts into a DC voltage an AC voltage induced across both ends of the power secondary inductor; a power-receiver voltage controller which measures a level of the voltage outputted from the rectifier and supplied to the receiving side load, and outputs the burst signal after controlling an interval at which the burst signal is outputted depending on the measured voltage level; and a switching unit which is coupled between one end of the power secondary inductor and the rectifier, and changes series impedance of the power secondary inductor by performing an ON/OFF operation based on the burst signal generated by the power-receiver voltage controller. Furthermore, the power transmitting unit of the power supply system comprises a power primary inductor which is excited based on an AC signal; a filter unit which filters out a resonance frequency produced by the power primary inductor and parasitic capacitance; and a power-transmitter voltage controller which detects the burst signal from a signal outputted from the filter unit, determines whether the electric power of the receiving side load is short or surplus by measuring an output interval from the detected burst signal, and controls the increase and decrease of the power to be transmitted to the power receiving unit by controlling the AC signal to be supplied to the power primary inductor.

Furthermore, the present invention provides a power supply system in which the power-receiver voltage controller comprises a voltage detector which detects whether the voltage level outputted from the rectifier and supplied to the receiving side load is lower than a lower limit voltage threshold, or higher than an upper limit voltage threshold higher than the lower limit voltage threshold, or within the limits of a reference voltage between the lower limit voltage threshold and the upper limit voltage threshold; a burst interval setting unit which sets up an interval at which the burst signal is outputted, based on the voltage level detected by the voltage detector; and a burst signal generator which generates the burst signal at the interval set up by the burst interval setting unit, and controls motion of the switching unit. Furthermore, the power-transmitter voltage controller of the power supply system comprises a burst signal detector which detects a burst signal from a combined signal of the burst signal outputted from the filter unit and the excitation signal of the power primary inductor; an interval measuring unit which measures an output interval of the burst signal detected by the burst signal detector; and a controller which determines whether the electric power of the receiving side load is short or surplus, based on the output interval of the burst signal measured by the interval measuring unit, and controls the AC signal to be supplied to the power primary inductor by changing a period or the number of times to excite the power primary inductor.

The following explains briefly an effect obtained by the typical inventions to be disclosed in the present application.

(1) Since electric power can be transmitted corresponding to power consumption of the receiving side load, it is possible to prevent useless power transmission and to realize low power consumption.

(2) It is possible to reduce malfunction due to resonance, a noise, etc.

(3) Owing to the effects of (1) and (2), it is possible to improve reliability in the non-contact power transmission, and it is possible to supply a stable power supply voltage with decreased power consumption.

BRIEF DESCRIPTION OF THE DRAWINGS

The present invention will become fully understood from the detailed description given hereinafter and the accompanying drawings wherein.

DETAILED DESCRIPTION OF THE PREFERRED EMBODIMENTS

Hereinafter, embodiments of the present invention will be explained in detail with reference to the accompanying drawings. In the entire drawings for explaining the embodiments of the present invention, the same symbol is attached to the same component as a general rule, and the repeated explanation thereof is omitted.

(Embodiment 1)

Figure 1:
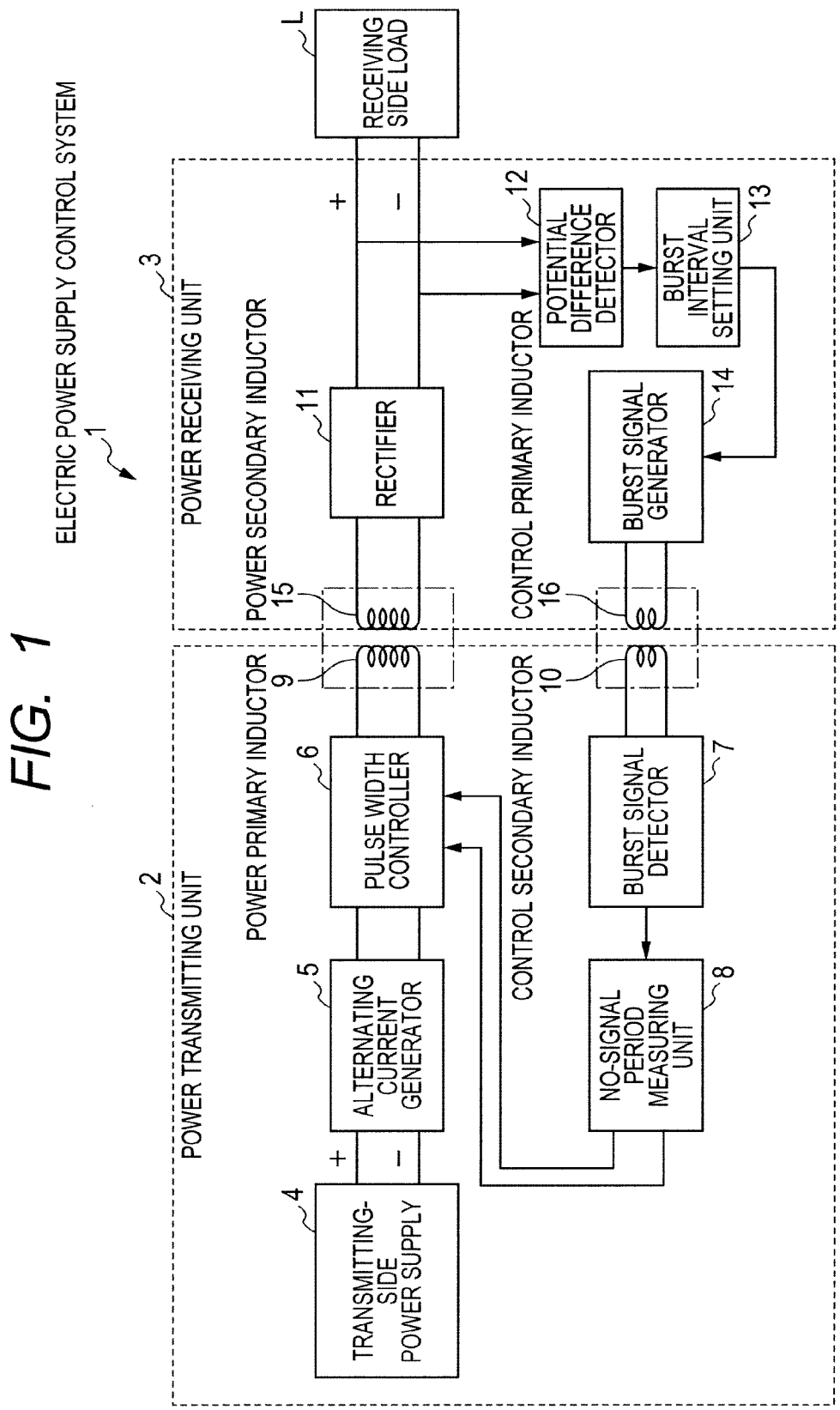
FIG. 1 is an explanatory drawing illustrating an example of a configuration of an electric power supply control system according to Embodiment 1 of the present invention.
Figure 2:
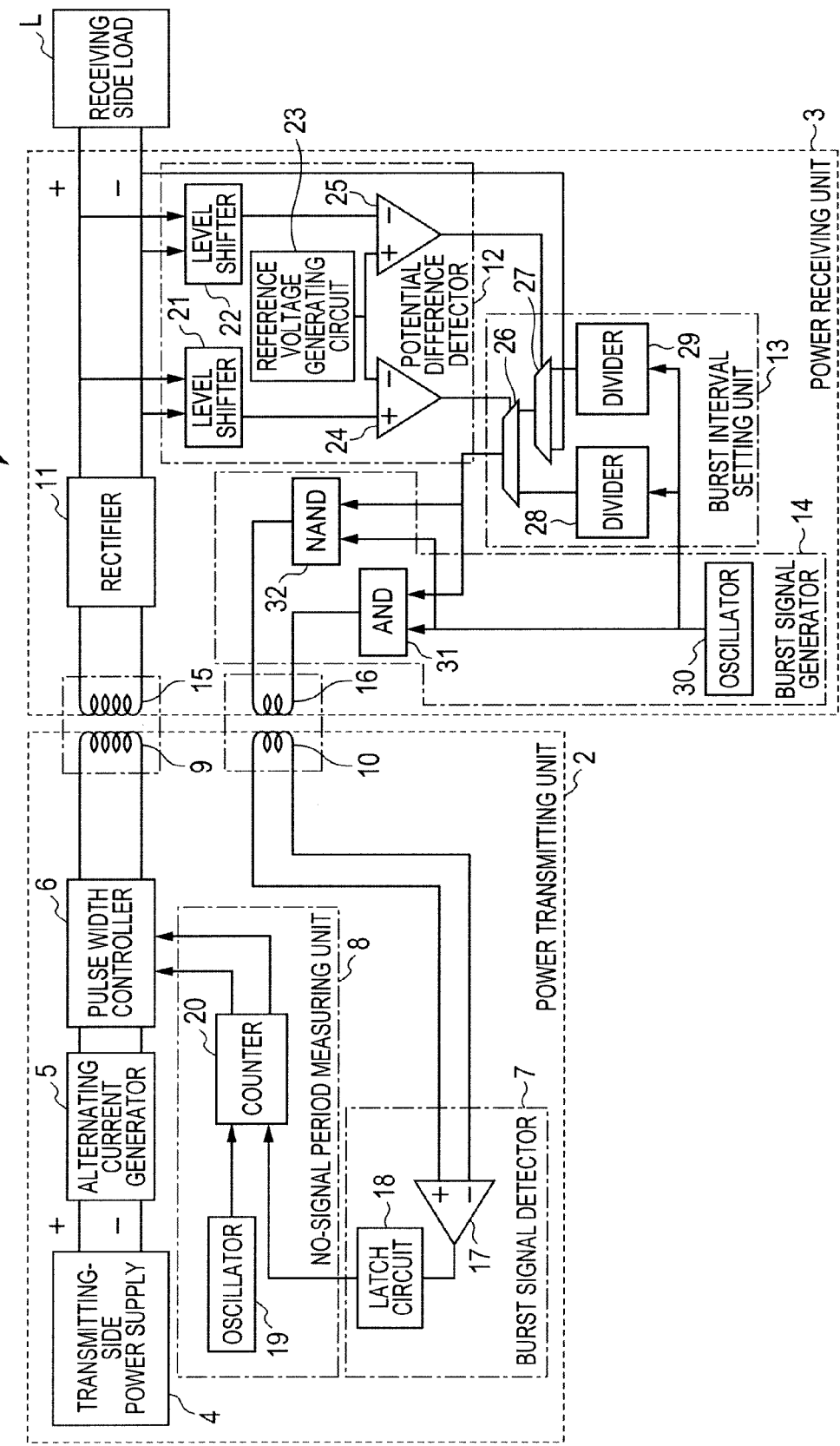
FIG. 2 is an explanatory drawing illustrating an example of a configuration of a burst signal detector, a no-signal period measuring unit, a potential difference detector, a burst interval setting unit, and a burst signal generator in the electric power supply control system illustrated in FIG. 1.
Figure 3:
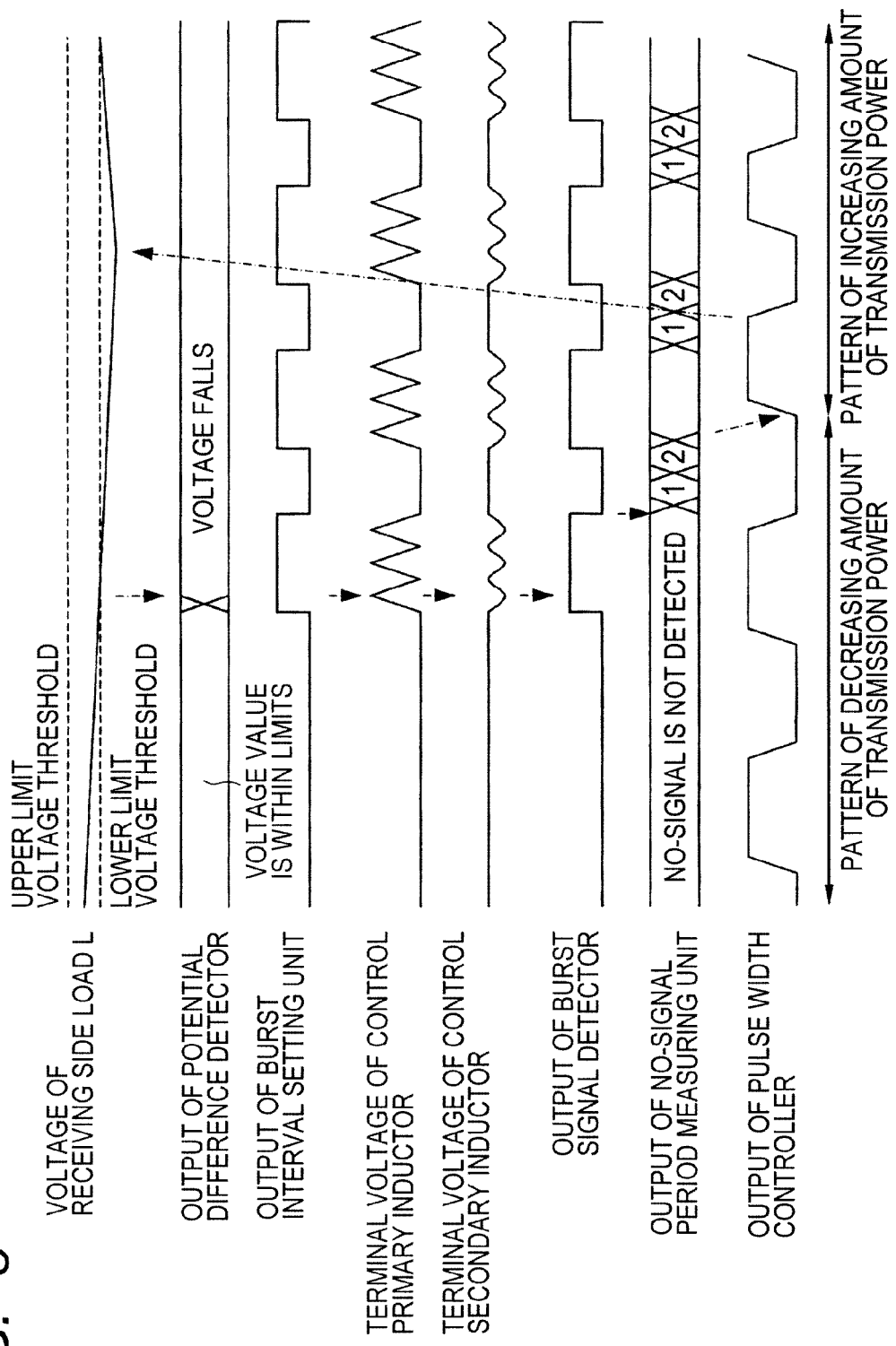
FIG. 3 is a timing chart of signals of each part in the electric power supply control system illustrated in FIG. 1, when the voltage of a receiving side load is decreased.
Figure 4:
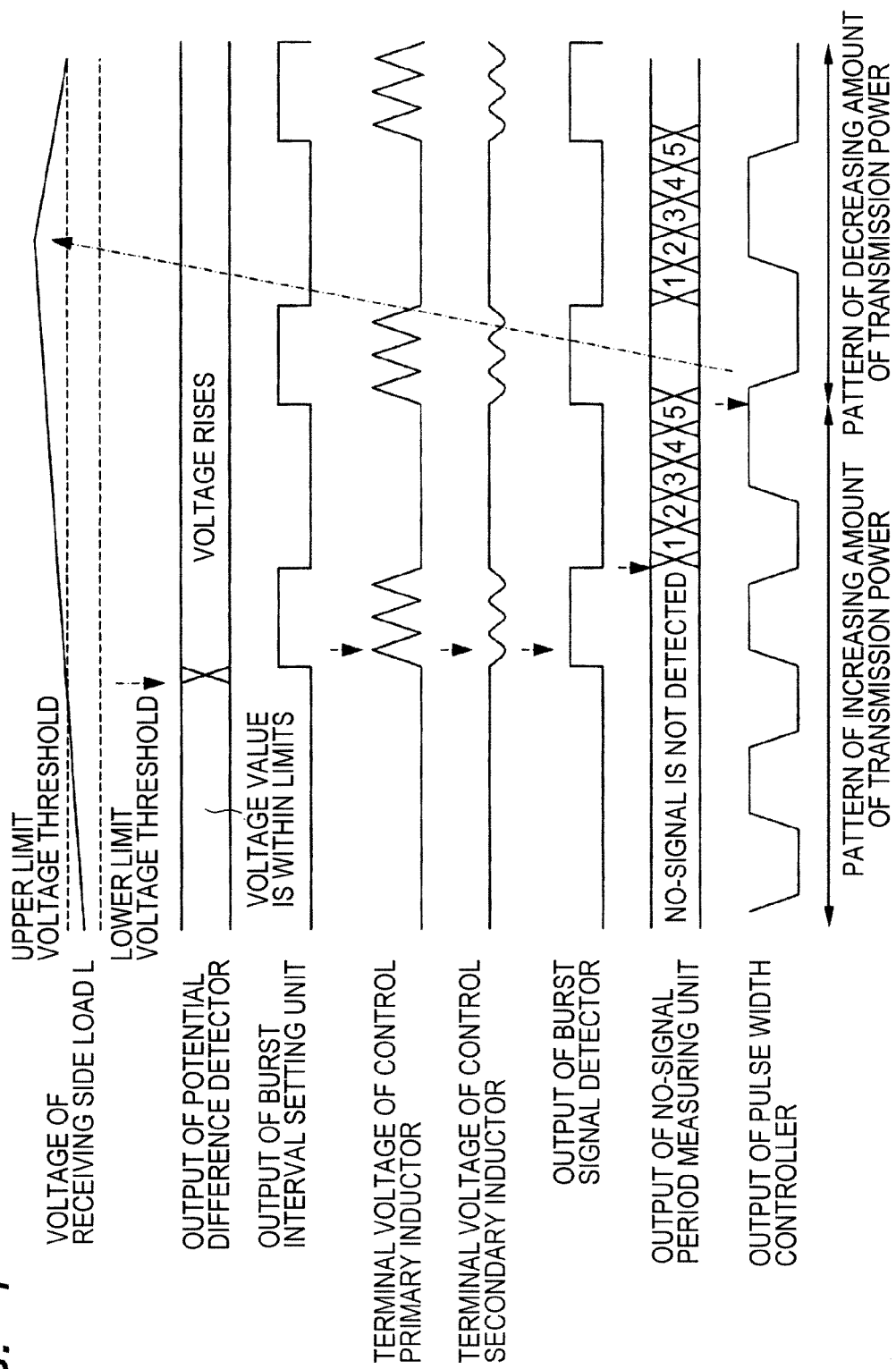
FIG. 4 is a timing chart of signals of each part in the electric power supply control system illustrated in FIG. 1, when the voltage of the receiving side load is increased.
Figure 5:
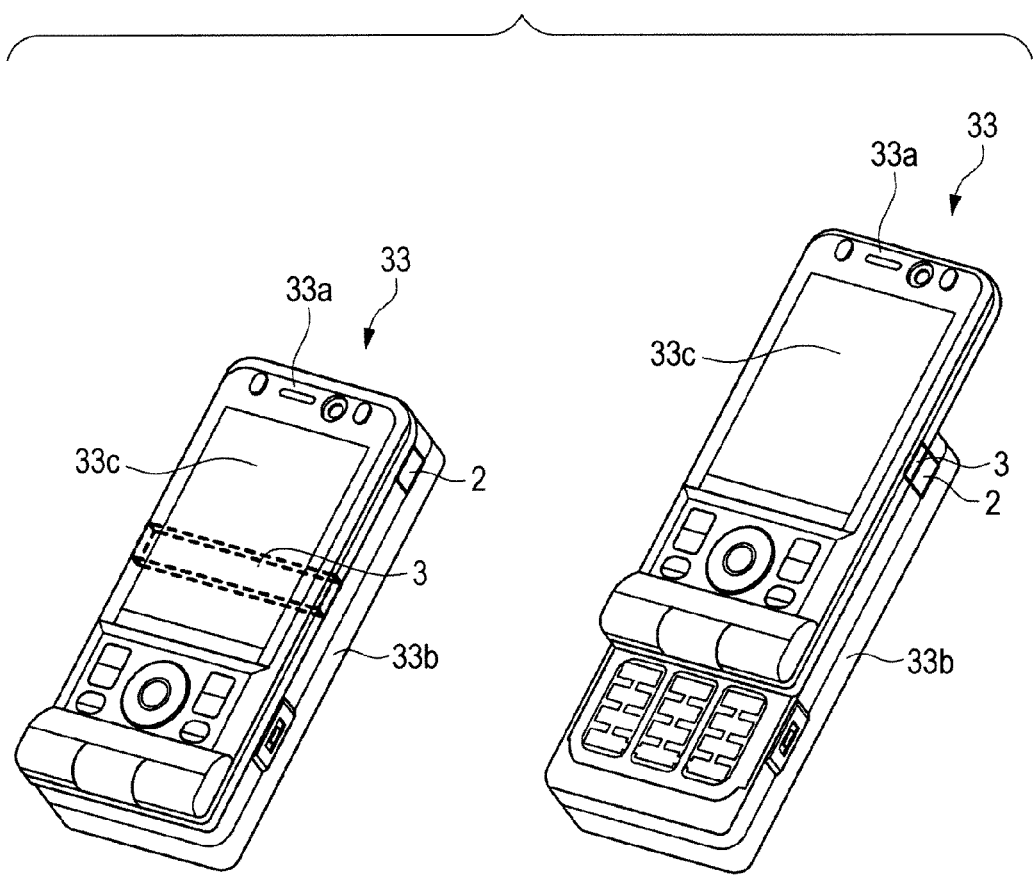
FIG. 5 is an explanatory drawing illustrating an example in which the electric power supply control system illustrated in FIG. 1 is applied to a mobile-phone.
Figure 6:
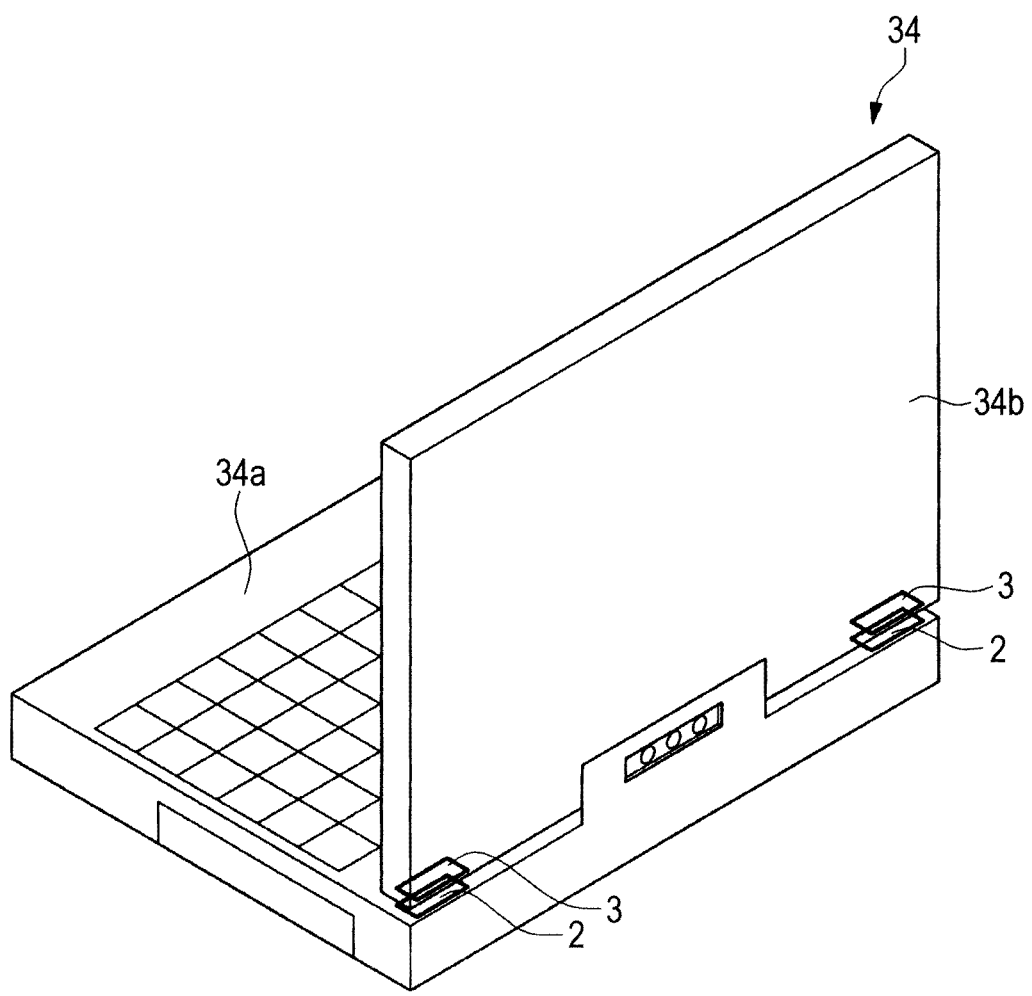
FIG. 6 is an explanatory drawing illustrating an example in which the electric power supply control system illustrated in FIG. 1 is applied to a personal computer.
Figure 7:
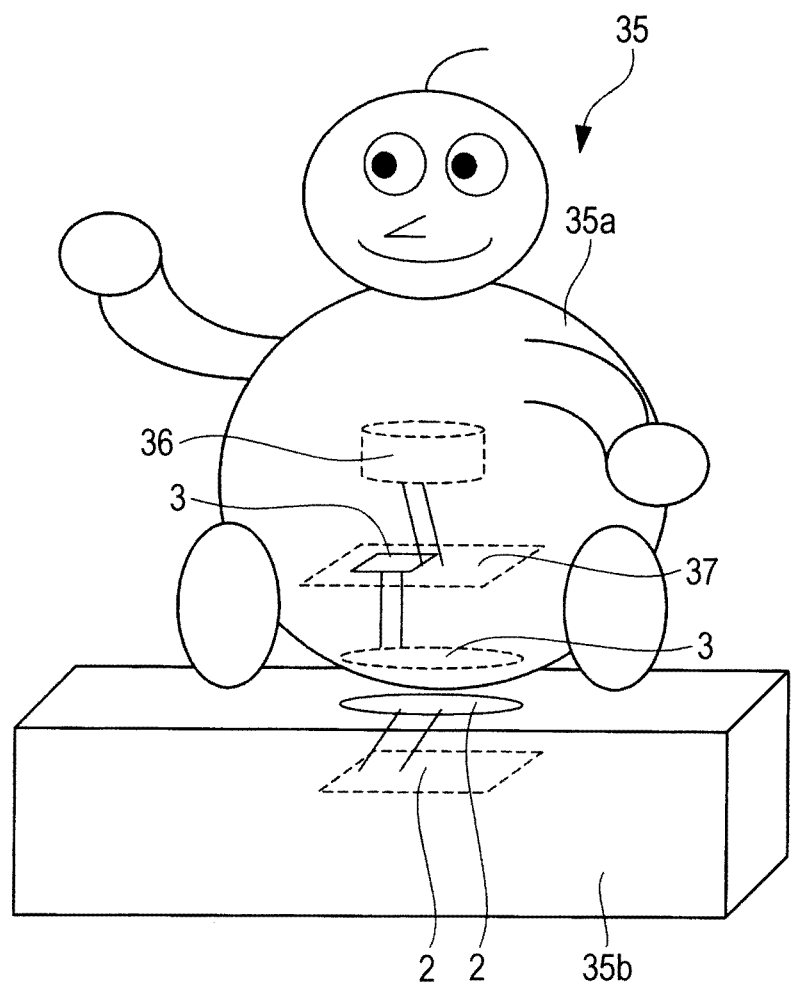
FIG. 7 is an explanatory drawing illustrating an example in which the electric power supply control system illustrated in FIG. 1 is applied to a toy.

FIG. 1 is an explanatory drawing illustrating an example of a configuration of an electric power supply control system according to Embodiment 1 of the present invention; FIG. 2 is an explanatory drawing illustrating an example of a configuration of a burst signal detector, a no-signal period measuring unit, a potential difference detector, a burst interval setting unit, and a burst signal generator in the electric power supply control system illustrated in FIG. 1; FIG. 3 is a timing chart of signals of each part in the electric power supply control system illustrated in FIG. 1, when the voltage of a receiving side load is decreased; FIG. 4 is a timing chart of signals of each part in the electric power supply control system illustrated in FIG. 1, when the voltage of the receiving side load is increased; FIG. 5 is an explanatory drawing illustrating an example in which the electric power supply control system illustrated in FIG. 1 is applied to a mobile-phone; FIG. 6 is an explanatory drawing illustrating an example in which the electric power supply control system illustrated in FIG. 1 is applied to a personal computer; and FIG. 7 is an explanatory drawing illustrating an example in which the electric power supply control system illustrated in FIG. 1 is applied to a toy.

In Embodiment 1, the electric power supply control system 1 is a system in which electric power is supplied in a non-contact manner, corresponding to power consumption of a receiving side load. The electric power supply control system 1 serving as a power supply system comprises a power transmitting unit 2 which transmits electric power, and a power receiving unit 3 which receives electric power, as illustrated in FIG. 1.

When the electric power supply control system 1 is applied to a printer, for example, the power transmitting unit 2 will be provided in a printer body, the power receiving unit 3 will be provided in an ink cartridge, and electric power is supplied in a non-contact manner from the power transmitting unit 2 to the power receiving unit 3.

The power transmitting unit 2 comprises a transmitting-side power supply 4, an alternating current generator 5, a pulse width controller 6, a burst signal detector 7, a no-signal period measuring unit 8, a power primary inductor 9, and a control secondary inductor 10. A power transmitting controller is formed by the pulse width controller 6, the burst signal detector 7, and the no-signal period measuring unit 8.

The transmitting-side power supply 4 is coupled to the alternating current generator 5. The alternating current generator 5 is coupled to the pulse width controller 6 serving as the controller, and the pulse width controller 6 is coupled to the power primary inductor 9.

The control secondary inductor 10 is coupled to the burst signal detector 7, and the burst signal detector 7 is coupled to the no-signal period measuring unit 8 serving as an interval measuring unit. The no-signal period measuring unit 8 is coupled to the pulse width controller 6.

The transmitting-side power supply 4 supplies a DC voltage. The alternating current generator 5 converts into an AC voltage the DC voltage supplied from the transmitting-side power supply 4. The pulse width controller 6 controls an interval at which the power primary inductor 9 is excited, based on an output of the alternating current generator 5 and an output signal of the no-signal period measuring unit 8.

From an AC signal induced across both ends of the control secondary inductor 10, the burst signal detector 7 detects that a burst signal, which indicates the shortage, surplus, and others of the electric power supplied to the receiving side load L, has been transmitted. The no-signal period measuring unit 8 measures a period of a no-signal state between burst signals.

The power primary inductor 9 is excited by an output signal of the pulse width controller 6. The control secondary inductor 10 generates electromotive force in response to a magnetic field change of the control primary inductor 16.

The power receiving unit 3 comprises a rectifier 11, a potential difference detector 12, a burst interval setting unit 13, a burst signal generator 14, a power secondary inductor 15, and a control primary inductor 16. A power receiving controller is formed by the potential difference detector 12, the burst interval setting unit 13, and the burst signal generator 14.

The power secondary inductor 15 is coupled to an input terminal of the rectifier 11. An output terminal of the rectifier 11 is coupled respectively to the receiving side load L and the potential difference detector 12 serving as a voltage detector. The power secondary inductor 15 generates electromotive force in response to a magnetic field change of the power primary inductor 9.

The rectifier 11 converts into a DC voltage an AC voltage induced across both ends of the power secondary inductor 15. The potential difference detector 12 determines whether a voltage level outputted from the rectifier 11 is in a voltage range arbitrarily set up in advance.

The potential difference detector 12 is coupled to the burst interval setting unit 13, and the burst interval setting unit 13 is coupled to the burst signal generator 14. The burst signal generator 14 is coupled to the control primary inductor 16.

The burst interval setting unit 13 sets up a period during which a burst signal is not transmitted, based on the determination result outputted from the potential difference detector 12. The burst signal generator 14 generates the burst signal.

FIG. 2 is an explanatory drawing illustrating an example of a configuration of the burst signal detector 7, the no-signal period measuring unit 8, the potential difference detector 12, the burst interval setting unit 13, and the burst signal generator 14 in the electric power supply control system 1.

The burst signal detector 7 comprises a differential amplifier 17 and a latch circuit 18. One end of the control secondary inductor 10 is coupled to a plus (+) input terminal of the differential amplifier 17, and the other end of the control secondary inductor 10 is coupled to a minus (−) input terminal of the differential amplifier 17.

An output terminal of the differential amplifier 17 is coupled to an input terminal of the latch circuit 18. The latch circuit 18 holds its output at a Hi level while receiving the burst signal.

The no-signal period measuring unit 8 comprises an oscillator 19 and a counter 20. The counter 20 is coupled to the latch circuit 18. The counter 20 counts cycles of a clock signal outputted from the oscillator 19 for a period during which an output signal of the burst signal detector 7 is at a Lo level.

The potential difference detector 12 comprises level shifters 21 and 22, a reference voltage generating circuit 23, and comparators 24 and 25. Respective input terminals of the level shifters 21 and 22 are coupled to output terminals of the rectifier 11. The level shifters 21 and 22 shift the output voltage of the rectifier 11 to arbitrarily different voltage levels, respectively.

An output terminal of the level shifter 21 is coupled to a plus (+) input terminal of the comparator 24. An output terminal of the level shifter 22 is coupled to a minus (−) input terminal of the comparator 25.

A minus (−) input terminal of the comparator 24 and a plus (+) input terminal of the comparator 25 are coupled to the reference voltage generating circuit 23, so as to be fed with a reference voltage outputted from the reference voltage generating circuit 23, respectively. The reference voltage generating circuit 23 is configured by a band-gap reference circuit or a button cell, for example.

The comparators 24 and 25 compare respectively the voltage levels outputted from the level shifters 21 and 22 with the reference voltage outputted from the reference voltage generating circuit 23, and output the result.

The burst interval setting unit 13 comprises selectors 26 and 27 and dividers 28 and 29. The burst signal generator 14 comprises an oscillator 30, an AND circuit 31, and a NAND circuit 32.

The dividers 28 and 29 divide the clock signal outputted from the oscillator 30. The divider 28 has a larger period value than the divider 29. An output terminal of the divider 28 is coupled to one input terminal of the selector 26, and the other input terminal of the selector 26 is coupled to an output terminal of the selector 27.

An output terminal of the divider 29 is coupled to one input terminal of the selector 27, and the other input terminal of the selector 27 is coupled to the reference potential VSS.

A control terminal of the selector 26 is coupled to an output terminal of the comparator 24, and a control terminal of the selector 27 is coupled to an output terminal of the comparator 25. The selectors 26 and 27 choose and output a signal inputted into one of the two input terminals based on a signal inputted into the control terminal.

One input terminal of the AND circuit 31 and one input terminal of the NAND circuit 32 are coupled to the oscillator 30, so as to be fed with a clock signal outputted from the oscillator 30. The other input terminal of the AND circuit 31 and the other input terminal of the NAND circuit 32 are coupled to an output terminal of the selector 26.

Next, operation of the electric power supply control system 1 in the present embodiment is explained.

FIG. 3 is a timing chart of signals of each part in the electric power supply control system 1, when the voltage of the receiving side load L is decreased.

FIG. 3 illustrates respective signal timing of, from top to bottom, a voltage of the receiving side load L, and an output signal of the potential difference detector 12, an output signal of the burst interval setting unit 13, a terminal voltage of the control primary inductor 16, a terminal voltage of the control secondary inductor 10, an output signal of the burst signal detector 7, an output signal of the no-signal period measuring unit 8, and an output signal of the pulse width controller 6.

First, when the power supply voltage of the receiving side load L is decreased lower than a lower limit voltage threshold set up in advance, the potential difference detector 12 detects that the power supply voltage of the receiving side load L is decreased lower than the lower limit voltage threshold, and outputs the detection result to the burst interval setting unit 13.

The burst interval setting unit 13 outputs pulses of width which corresponds to a period to make burst transmission and a period to stop burst transmission (as long as two cycles in the example of FIG. 3). Here, the pulses are outputted from the divider 29 to which a smaller period value has been set up than the divider 28, and the burst transmission is made in order to notify that the voltage value of the receiving side load L is decreased.

Then, in the burst signal generator 14, the AND circuit 31 and the NAND circuit 32 excite the control primary inductor 16 so that a burst signal and no signal may be repeated alternately, based on the output of the burst interval setting unit 13. In response to the magnetic field change of the control primary inductor 16, a voltage change in which a burst signal and no signal are repeated alternately is induced in the control secondary inductor 10.

In response to the electromotive force, the differential amplifier 17 of the burst signal detector 7 generates a pulse signal having a Hi level for a period of the burst signal and a Lo level for a no-signal period. The no-signal period measuring unit 8 is activated when the burst signal detector 7 detects the burst signal, and measures a no-signal period between a burst signal and a next burst signal which are outputted from the burst signal detector 7, with the use of the counter 20.

The no-signal period measuring unit 8 outputs the measurement result to the pulse width controller 6. In FIG. 3, the no-signal period is detected repeatedly in two cycles. When the no-signal period is two cycles, it is indicated that the voltage value of the receiving side load L is decreased lower than the lower limit voltage threshold.

Accordingly, when the notice (the no-signal period is two cycles) indicating that the voltage value of the receiving side load L is decreased, is received from the no-signal period measuring unit 8, the pulse width controller 6 modifies and outputs the signal outputted from the alternating current generator 5 so as to lengthen a period to excite the power primary inductor 9 or to increase the number of times to excite the power primary inductor 9.

As a result, electromotive force generated in the power secondary inductor 15 increases via the magnetic field coupling of the power primary inductor 9. When the voltage of the receiving side load L is increased higher than the lower limit voltage threshold, the potential difference detector 12 detects that the voltage value of the receiving side load L is in the arbitrarily-set voltage range, and notifies the fact to the burst interval setting unit 13.

Since the voltage value of the receiving side load L is in the voltage range set up in advance, the burst interval setting unit 13 stops generation of the pulse signal. In response to the fact that the burst interval setting unit 13 has stopped the generation of the pulse signal, the burst signal generator 14 stops excitation of the control primary inductor 16.

Thereby, electromotive force corresponding to a burst signal is not generated in the control secondary inductor 10; accordingly, the burst signal detector 7 becomes in a Lo-level state indicating that no burst signal is detected.

When the measurement of the no-signal period by the no-signal period measuring unit 8 continues more than an arbitrary period, the pulse width controller 6 determines that the voltage value of the receiving side load L is in the setting range, and maintains the period or the number of times to excite the power primary inductor 9 as they are. As a result, the electromotive force generated in the power secondary inductor 15 via the magnetic field coupling of the power primary inductor 9 is maintained.

FIG. 4 is a timing chart of signals of each part in the electric power supply control system 1, when the voltage of the receiving side load L is increased.

As is the case with FIG. 3, FIG. 4 illustrates respective signal timing of, from top to bottom, a voltage of the receiving side load L, an output signal of the potential difference detector 12, an output signal of the burst interval setting unit 13, a terminal voltage of the control primary inductor 16, a terminal voltage of the control secondary inductor 10, an output signal of the burst signal detector 7, an output signal of the no-signal period measuring unit 8, and an output signal of the pulse width controller 6.

First, when the voltage of the receiving side load L is increased higher than the upper limit voltage threshold arbitrarily set up in advance, the potential difference detector 12 detects that the voltage of the receiving side load L is increased higher than the upper limit voltage threshold, and notifies the detection result to the burst interval setting unit 13.

The burst interval setting unit 13 outputs pulses of width which corresponds to a period to make burst transmission and a period to stop burst transmission (as long as five cycles in the example of FIG. 4). Here, the pulses are outputted from the divider 28, and the burst transmission is made in order to notify that the voltage value of the receiving side load L is increased higher than the upper limit voltage threshold.

In response, the burst signal generator 14 excites the control primary inductor 16 so that a burst signal and no signal may be repeated alternately, based on the output signal of the burst interval setting unit 13.

In response to the magnetic field change of the control primary inductor 16, a voltage change in which a burst signal and no signal are repeated alternately is induced in the control secondary inductor 10. In response to the electromotive force, the burst signal detector 7 generates a pulse signal having a Hi level for a period of the burst signal and a Lo level for a no-signal period.

The no-signal period measuring unit 8 is activated when the burst signal detector 7 detects the burst signal, and measures a no-signal period between a burst signal and a next burst signal which are outputted from the burst signal detector 7. The no-signal period measuring unit 8 notifies the pulse width controller 6 of the measured result.

In FIG. 4, the no-signal period is detected repeatedly in five cycles. In the present case where the no-signal period is five cycles, it is indicated that the voltage value of the receiving side load L is increased higher than the upper limit voltage threshold.

Accordingly, the pulse width controller 6 determines that the voltage value of the receiving side load L is higher than the upper limit voltage threshold, and modifies and outputs the signal outputted from the alternating current generator 5 so as to shorten a period to excite the power primary inductor 9 or to decrease the number of times to excite the power primary inductor 9.

As a result, electromotive force generated in the power secondary inductor 15 decreases via the magnetic field coupling of the power primary inductor 9. When the voltage of the receiving side load L is decreased lower than the upper limit voltage threshold, the potential difference detector 12 detects that the voltage value of the receiving side load L is in the setting range, and notifies the fact to the burst interval setting unit 13.

Since the voltage value of the receiving side load L is in the setting range, the burst interval setting unit 13 stops generation of the pulse signal. The burst signal generator 14 stops excitation of the control primary inductor 16 in response to the output of the burst interval setting unit 13.

When the measurement of the no-signal period by the no-signal period measuring unit 8 continues more than an arbitrary period, the pulse width controller 6 determines that the voltage value of the receiving side load L is in the setting range, and maintains the period or the number of times to excite the power primary inductor 9 as they are. As a result, the electromotive force generated in the power secondary inductor 15 via the magnetic field coupling of the power primary inductor 9 is maintained.

In this way, the electric power supply control system 1 performs start and stop of adjustment of the amount of current which flows through the power primary inductor 9, according to detection and non-detection of a burst signal induced in the control secondary inductor 10, and performs the increase and decrease of the amount of current which flows through the power primary inductor 9, according to a short and long period of no burst signal after the detection of the burst signal. Therefore, it is possible to transmit electric power corresponding to the power consumption of the receiving side load L.

Next, FIGS. 5-7 illustrate the mode of application of the electric power supply control system 1 to various electronic equipment.

FIG. 5 illustrates an example in which the electric power supply control system 1 is applied to a mobile-phone 33. In the present case, the mobile-phone 33 adopts a slide system in which an upper part 33a and a lower part 33b slide up and down.

The power transmitting unit 2 of the electric power supply control system 1 is provided in the lower part 33b, and the power receiving unit 3 is provided in the upper part 33a. The power transmitting unit 2 and the power receiving unit 3 are disposed in such positions that they do not face with each other when the upper part 33a and the lower part 33b are not in a slid position as illustrated in the left-hand side of FIG. 5, and that they face with each other when the upper part 33a and the lower part 33b are in a slid position as illustrated in the right-hand side of FIG. 5.

Accordingly, the upper part 33a and the lower part 33b are configured such that, when the upper part 33a and the lower part 33b are in the slid position, electric power is transmitted to the power receiving unit 3, and supplied to, for example, a liquid crystal display 33c etc., provided in the upper part 33a.

FIG. 6 illustrates an example in which the electric power supply control system 1 is applied to a note-type personal computer 34. In the present case, the power transmitting unit 2 is provided in a corner part of a main body 34a of the personal computer 34, and the power receiving unit 3 is provided in a corner part of a liquid crystal display 34b, etc. of the personal computer 34 as illustrated in FIG. 6.

When the liquid crystal display 34b is opened, the power transmitting unit 2 and the power receiving unit 3 are positioned facing with each other; accordingly, electric power is transmitted to the liquid crystal display 34b.

FIG. 7 illustrates an example in which the electric power supply control system 1 is applied to a toy 35. The toy 35 comprises a stuffed toy 35a and a stuffed toy stand 35b on which the stuffed toy 35a is mounted, as illustrated in FIG. 7.

The power transmitting unit 2 is provided in the stuffed toy stand 35b, and the power receiving unit 3 is provided in the lower part of the stuffed toy 35a. The power transmitting unit 2 and the power receiving unit 3 are arranged such that they face with each other when the stuffed toy 35a is mounted on the stuffed toy stand 35b.

The stuffed toy 35a houses, for example, a piezoelectric sounder 36 and a control board 37 on which a control circuit for controlling the piezoelectric sounder 36 and a power receiving unit 3 are mounted. By transmitting electric power from the power transmitting unit 2 to the power receiving unit 3, electric power is supplied to the control circuit of the control board 37, and arbitrary beeps etc. are generated by the piezoelectric sounder 36 under the control of the control circuit.

In this way, by adopting the electric power supply control system 1, electric power can be supplied to various electronic equipment, such as a liquid crystal display which cannot afford a space for housing a battery, or a toy which cannot provide a lid for exchanging a battery, and, moreover, the electric power supply can be performed in a non-contact manner. Therefore, even if a jointing part is moved, it is possible to avoid problems such as wear and disconnection.

According to Embodiment 1, electric power is transmitted corresponding to power consumption of the receiving side load L. Therefore, it is possible to eliminate wastefulness of electric power and to realize low power consumption.

Since the start and stop of adjustment of the amount of current which flows through the power primary inductor 9 is performed according to the existence or nonexistence of a burst signal, it becomes unnecessary to determine whether the signal is at a Hi level ('1') or at a Lo level ('0'), thereby allowing to omit a circuit to demodulate '1' and '0'. Accordingly, it is possible to prevent increase of a circuit scale of the electric power supply control system 1.

Furthermore, since the amount of current of the power primary inductor 9 is increased or decreased according to the number of cycles during a no-signal period between burst signals, it is possible to reduce malfunction which may be caused by interfusion of a resonance waveform and a noise waveform.

Since the burst signal generator 14 which generates a burst signal can be realized by a simple circuit configuration, it is possible to reduce the circuit scale of the electric power supply control system 1.

(Embodiment 2)

Figure 8:
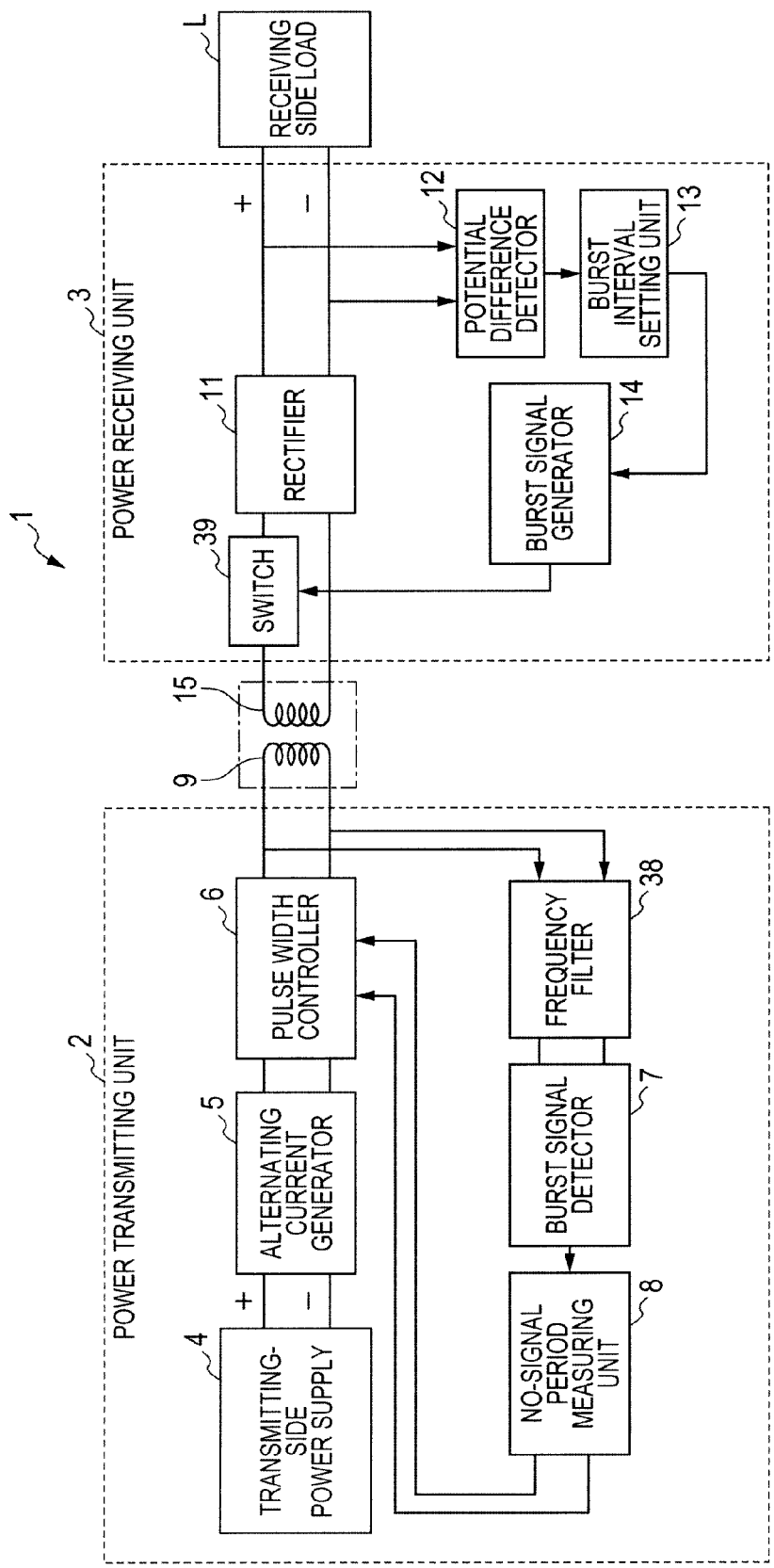
FIG. 8 is an explanatory drawing illustrating an example of a configuration of an electric power supply control system according to Embodiment 2 of the present invention.
Figure 9:
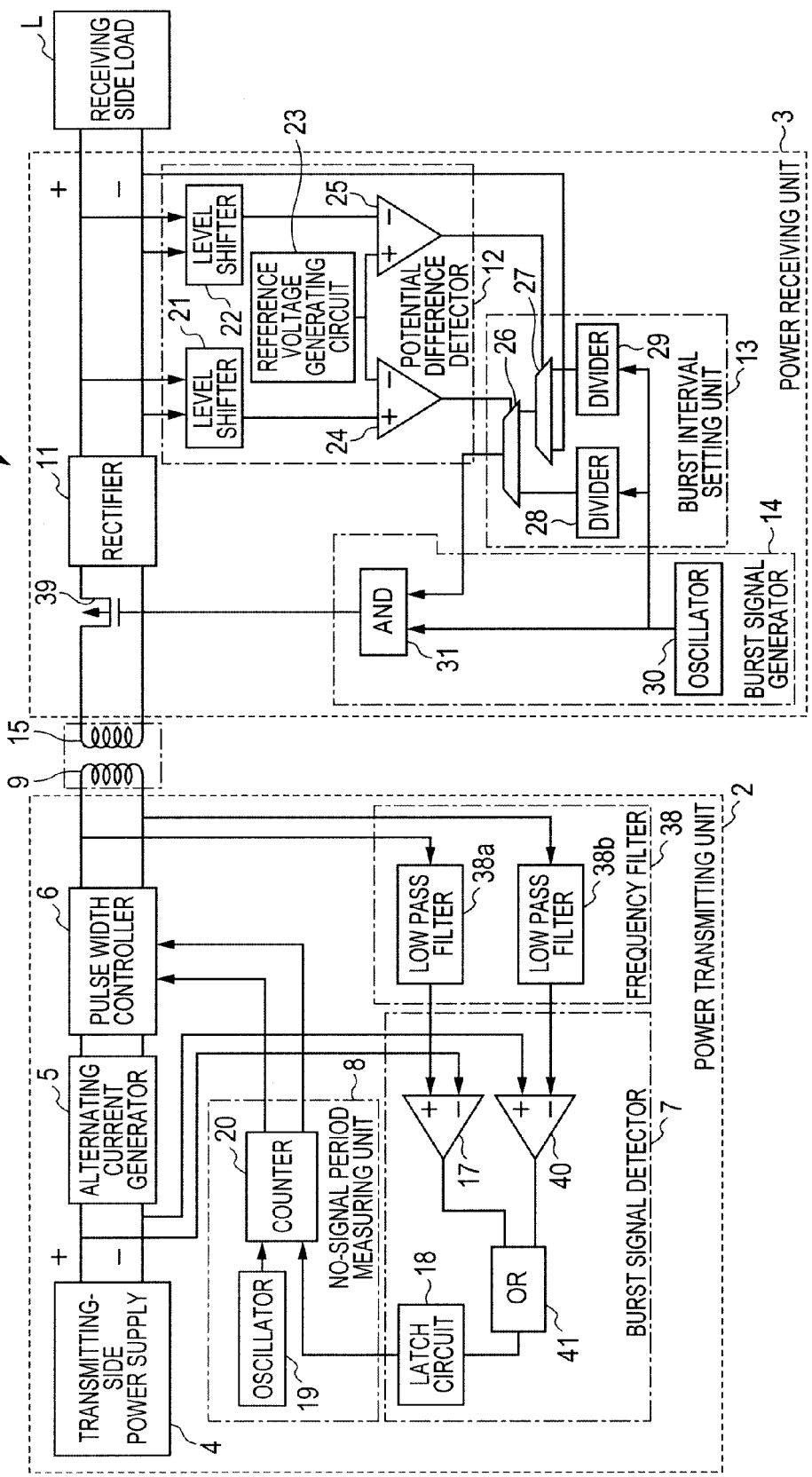
FIG. 9 is an explanatory drawing illustrating an example of a configuration of a burst signal detector, a no-signal period measuring unit, a frequency filter, a potential difference detector, a burst interval setting unit, a burst signal generator, and a switch in the electric power supply control system illustrated in FIG. 8.
Figure 10:
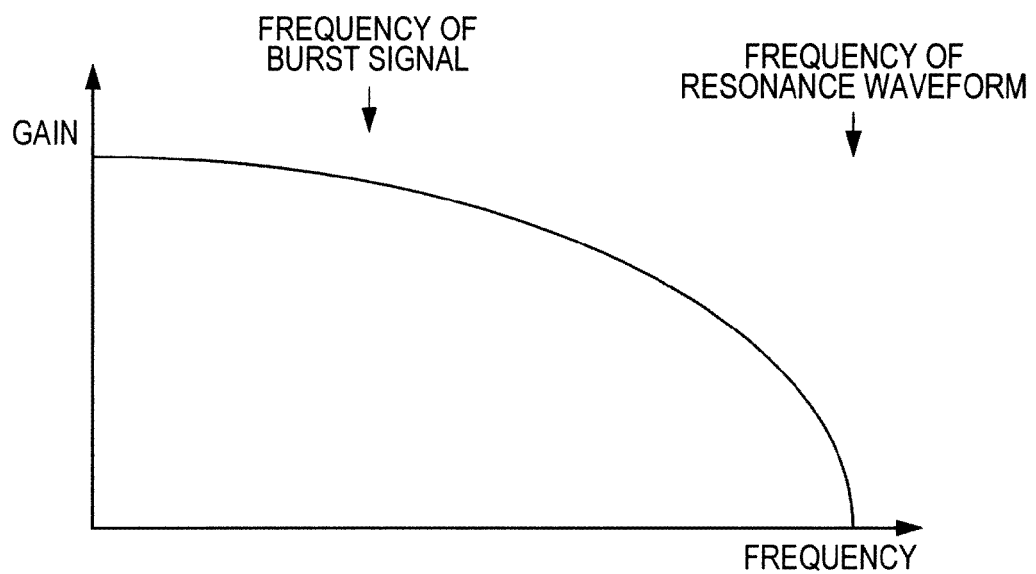
FIG. 10 is an explanatory drawing illustrating an example of the characteristics of the frequency filter provided in the electric power supply control system of FIG. 9.
Figure 11:
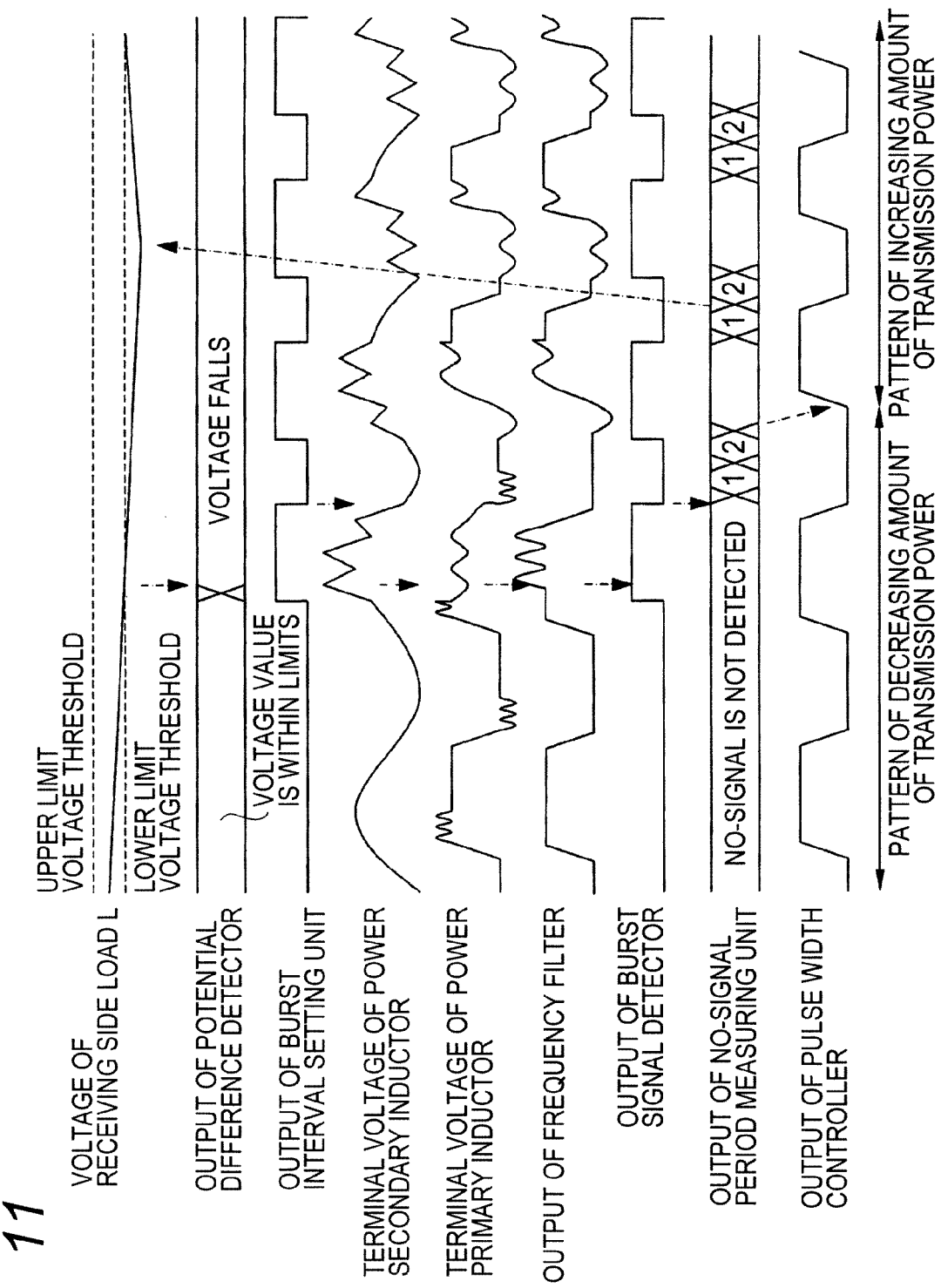
FIG. 11 is a timing chart of signals of each part in the electric power supply control system illustrated in FIG. 8, when the voltage of a receiving side load is decreased.
Figure 12:
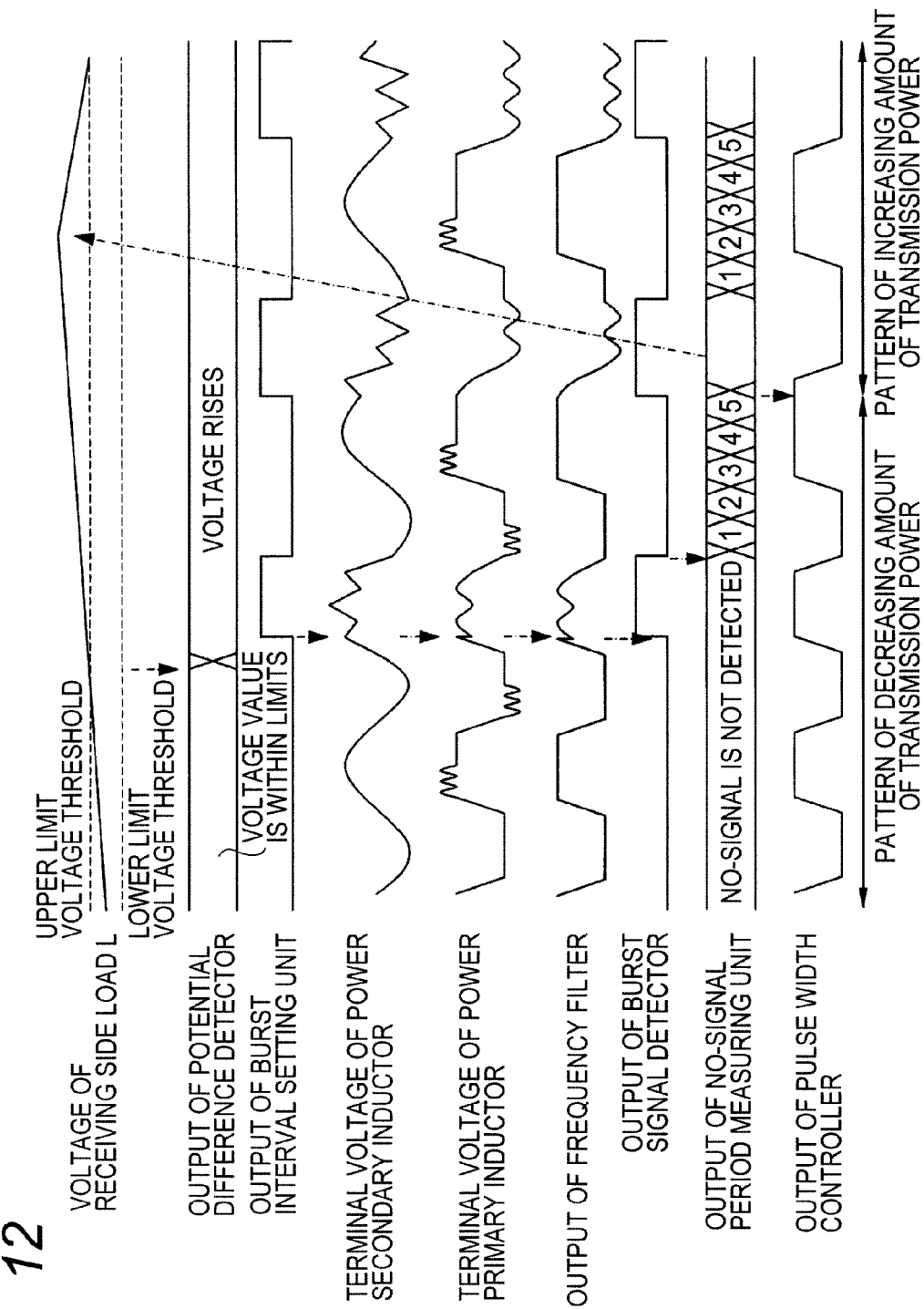
FIG. 12 is a timing chart of signals of each part in the electric power supply control system illustrated in FIG. 8, when the voltage of the receiving side load is increased.

FIG. 8 is an explanatory drawing illustrating an example of a configuration of an electric power supply control system according to Embodiment 2 of the present invention; FIG. 9 is an explanatory drawing illustrating an example of a configuration of a burst signal detector, a no-signal period measuring unit, a frequency filter, a potential difference detector, a burst interval setting unit, a burst signal generator, and a switch in the electric power supply control system illustrated in FIG. 8; FIG. 10 is an explanatory drawing illustrating an example of the characteristics of the frequency filter provided in an electric power supply control system of FIG. 9; FIG. 11 is a timing chart of signals of each part in the electric power supply control system illustrated in FIG. 8, when the voltage of a receiving side load is decreased; and FIG. 12 is a timing chart of signals of each part in the electric power supply control system illustrated in FIG. 8, when the voltage of the receiving side load is increased.

In Embodiment 2, the electric power supply control system 1 is configured such that the control primary inductor 16 and the control secondary inductor 10 illustrated in FIG. 1 according to Embodiment 1 are not necessary.

The electric power supply control system 1 comprises a power transmitting unit 2 and a power receiving unit 3 as is the case with Embodiment 1, as illustrated in FIG. 8. In the power transmitting unit 2, a frequency filter 38 serving as a filter unit is newly provided and the control secondary inductor 10 is omitted from the configuration illustrated in FIG. 1 according to Embodiment 1.

In the power receiving unit 3, a switch 39 serving as a switching unit is newly provided and the control primary inductor 16 is omitted from the configuration illustrated in FIG. 1 according to Embodiment 1.

Input terminals of the frequency filter 38 are coupled to both ends of the power primary inductor 9, respectively, and output terminals of the frequency filter 38 are coupled to the burst signal detector 7. One terminal of the switch 39 is coupled to one end of the power secondary inductor 15, and the other terminal of the switch 39 concerned is coupled to one input terminal of the rectifier 11.

An output terminal of the burst signal generator 14 is coupled to a control terminal of the switch 39. The other coupling configuration is the same as that illustrated in FIG. 1 according to Embodiment 1. Therefore, the explanation thereof is omitted.

FIG. 9 is an explanatory drawing illustrating an example of a configuration of a burst signal detector 7, a no-signal period measuring unit 8, a frequency filter 38, a potential difference detector 12, a burst interval setting unit 13, a burst signal generator 14, and a switch 39 in the electric power supply control system 1 illustrated in FIG. 8.

The frequency filter 38 comprises low pass filters 38a and 38b. The burst signal detector 7 comprises a differential amplifier 40 and an OR circuit 41 in addition to the differential amplifier 17 and the latch circuit 18 of FIG. 2.

One end of the power primary inductor 9 is coupled to an input terminal of the low pass filter 38a, and the other end of the power primary inductor 9 is coupled to an input terminal of the low pass filter 38b.

An output terminal of the low pass filter 38a is coupled to a plus (+) input terminal of the differential amplifier 17, and the reference potential VSS of the transmitting-side power supply 4 is coupled to a minus (−) input terminal of the differential amplifier 17.

An output terminal of the low pass filter 38b is coupled to a minus (−) input terminal of the differential amplifier 40, and the power supply voltage Vcc of the transmitting-side power supply 4 is coupled to a plus (+) input terminal of the differential amplifier 40.

In order to filter out a resonance frequency produced by the power primary inductor 9 and parasitic capacitance, the low pass filters 38a and 38b have frequency characteristics in which a frequency higher than the burst signal is attenuated, for example, as illustrated in FIG. 10.

An output terminal of the differential amplifier 17 is coupled to one input terminal of the OR circuit 41, and an output terminal of the differential amplifier 40 is coupled to the other input terminal of the OR circuit 41. An output terminal of the OR circuit 41 is coupled to an input terminal of the latch circuit 18.

The switch 39 is composed of a P-channel MOS transistor, for example. One terminal of the transistor is coupled to one end of the power secondary inductor 15, and the other terminal of the transistor is coupled to one input terminal of the rectifier 11.

A gate (control terminal) of the transistor is coupled to an output terminal of the burst signal generator 14.

The burst signal generator 14 is configured to comprise an oscillator 30 and an AND circuit 31, omitting the NAND circuit 32 from the configuration of the burst signal generator 14 illustrated in FIG. 2 according to Embodiment 1.

Based on a signal outputted from the AND circuit 31 of the burst signal generator 14, the transistor is controlled to perform an ON/OFF operation. The other configurations and connection are the same as those illustrated in FIG. 2 according to Embodiment 1. Accordingly, the explanation thereof is omitted.

FIG. 11 is a timing chart of signals of each part in the electric power supply control system 1, when the voltage of the receiving side load L is decreased.

FIG. 11 illustrates respective signal timing of, from top to bottom, a voltage of the receiving side load L, and an output signal of the potential difference detector 12, an output signal of the burst interval setting unit 13, terminal voltage of the power secondary inductor 15, terminal voltage of the power primary inductor 9, an output signal of the frequency filter 38, an output signal of the burst signal detector 7, an output signal of the no-signal period measuring unit 8, and an output signal of the pulse width controller 6.

First, when the voltage of the receiving side load L is decreased lower than the lower limit voltage threshold, the potential difference detector 12 detects that the voltage of the receiving side load L is decreased lower than the lower limit voltage threshold, and notifies the detection result to the burst interval setting unit 13.

The burst interval setting unit 13 outputs pulses of width which corresponds to a period to make burst transmission and a period to stop burst transmission (as long as two cycles in the example of FIG. 11). Here, the burst transmission is made in order to notify that the voltage value of the receiving side load L is decreased lower than the lower limit voltage threshold.

The burst signal generator 14 supplies the switch 39 with a signal in which a burst signal and no signal are alternately repeated based on an output of the burst interval setting unit 13. The switch 39 changes the impedance value thereof so that a period when the impedance changes in the shape of a burst, and a period when the impedance does not change are repeated alternately.

By the action of change of the series impedance of the power secondary inductor 15, a voltage change in which a burst signal and no signal are repeated alternately is induced in the power primary inductor 9, superimposed on the output of the pulse width controller 6.

In the power primary inductor 9, a resonance waveform (ringing waveform) generated by the inductor and parasitic capacitance is also induced. Since the frequency filter 38 attenuates frequency higher than a prescribed frequency band, the resonance waveform is attenuated.

A signal in which the burst signal and the excitation signal of the power primary inductor are mixed is transferred to the burst signal detector 7. The burst signal detector 7 extracts only electromotive force induced by the burst signal, separating from the excitation signal, and generates a pulse signal which exhibits a Hi level in a period of the burst signal and a Lo level in a no-signal period.

The no-signal period measuring unit 8 is activated when the burst signal detector 7 detects the burst signal, and measures a period (no-signal period) between a Hi level and a next Hi level of the output signal of the burst signal detector 7.

In FIG. 11, since two cycles have been detected repeatedly, it is determined that the voltage value of the receiving side load L is decreased and the determination result is notified to the pulse width controller 6. When it is detected that the voltage value of the receiving side load L is decreased, the pulse width controller 6 modifies and outputs the output signal of the alternating current generator 5 so as to lengthen a period to excite the power primary inductor 9 or to increase the number of times to excite the power primary inductor 9.

As a result, electromotive force generated in the power secondary inductor 15 increases via the magnetic field coupling of the power primary inductor 9. When the voltage of the receiving side load L is increased higher than the lower limit voltage threshold, the potential difference detector 12 detects that the voltage value of the receiving side load L is in the setting range, and notifies the fact to the burst interval setting unit 13.

Since the voltage value of the receiving side load L is in the setting range, the burst interval setting unit 13 stops generation of the pulse signal. The burst signal generator 14 stops supply of the burst signal to the switch 39 in response to the output of the burst interval setting unit 13.

Since electromotive force corresponding to a burst signal is not generated in the power primary inductor 9, the burst signal detector 7 becomes in a Lo-level state indicating that no burst signal is detected. Since the Lo level has continued more than a prescribed period, the no-signal period measuring unit 8 determines that the voltage value of the receiving side load L is within the prescribed range, and notifies the fact to the pulse width controller 6.

Since the voltage value of the receiving side load L has recovered within the setting range, the pulse width controller 6 maintains the period or the number of times to excite the power primary inductor 9 as they are. As a result, the electromotive force generated in the power secondary inductor 15 via the magnetic field coupling of the power primary inductor 9 is maintained.

FIG. 12 is a timing chart of signals of each part in the electric power supply control system, when the voltage of the receiving side load L is increased. FIG. 12 illustrates the respective signal timing of the same as illustrated in FIG. 11.

First, when the voltage of the receiving side load L is increased higher than the upper limit voltage threshold, the potential difference detector 12 detects that the voltage of the receiving side load L is increased higher than the upper limit voltage threshold, and notifies the detection result to the burst interval setting unit 13.

The burst interval setting unit 13 outputs pulses of width which corresponds to a period to make burst transmission and a period to stop burst transmission (as long as five cycles in the example of FIG. 12). Here, the burst transmission is made in order to notify that the voltage value of the receiving side load L is increased higher than the upper limit voltage threshold.

The burst signal generator 14 supplies the switch 39 with a signal in which a burst signal and no signal are alternately repeated based on an output of the burst interval setting unit 13. The switch 39 changes the impedance value thereof so that a period when the impedance changes in the shape of a burst, and a period when the impedance does not change are repeated alternately.

By the action of change of the series impedance of the power secondary inductor 15, a voltage change in which a burst signal and no signal are repeated alternately is induced in the power primary inductor 9, superimposed on the output of the pulse width controller 6.

In the power primary inductor 9, a resonance waveform (ringing waveform) generated by the inductor and parasitic capacitance is also induced. Since the frequency filter 38 attenuates frequency higher than a prescribed frequency band, the resonance waveform is attenuated.

A signal in which the burst signal and the excitation signal of the power primary inductor are mixed is transferred to the burst signal detector 7. The burst signal detector 7 extracts only electromotive force induced by the burst signal, separating from the excitation signal, and generates a pulse signal exhibiting a Hi level in a period of the burst signal and a Lo level in a no-signal period.

The no-signal period measuring unit 8 is activated when the burst signal detector 7 detects the burst signal, and measures a period (no-signal period) between a Hi level and a next Hi level of the output signal of the burst signal detector 7.

In FIG. 12, since five cycles have been detected repeatedly, it is determined that the voltage value of the receiving side load L is increased and the fact is notified to the pulse width controller 6. When it is detected that the voltage value of the receiving side load L is increased, the pulse width controller 6 modifies and outputs the signal outputted from the alternating current generator 5 so as to shorten a period to excite the power primary inductor 9 or to decrease the number of times to excite the power primary inductor 9. As a result, electromotive force generated in the power secondary inductor 15 decreases via the magnetic field coupling of the power primary inductor 9.

When the voltage of the receiving side load L is decreased lower than the upper limit voltage threshold, the potential difference detector 12 detects that the voltage value of the receiving side load L is in the setting range, and notifies the fact to the burst interval setting unit 13. Since the voltage value of the receiving side load L is in the setting range, the burst interval setting unit 13 stops generation of the pulse signal.

The burst signal generator 14 stops supply of the burst signal to the switch 39 in response to the output of the burst interval setting unit 13. Since electromotive force corresponding to a burst signal is not generated in the power primary inductor 9, the burst signal detector 7 becomes in a Lo-level state indicating that no burst signal is detected.

Since the Lo level has continued more than a prescribed period, the no-signal period measuring unit 8 determines that the voltage value of the receiving side load L is within the prescribed range, and notifies the fact to the pulse width controller 6. Since the voltage value of the receiving side load L has recovered within the prescribed range, the pulse width controller 6 maintains the period or the number of times to excite the power primary inductor 9 as they are. As a result, the electromotive force generated in the power secondary inductor 15 via the magnetic field coupling of the power primary inductor 9 is maintained.

Here, since the potential difference detector 12, the burst interval setting unit 13, and the burst signal generator 14 operate by means of the electric power supplied to the receiving side load L, at the time of starting transmission of the electric power to the receiving side, the voltage supplied to the potential difference detector 12, the burst interval setting unit 13, and the burst signal generator 14 is low, not allowing these elements to perform prescribed operation. Therefore, the burst signal is not outputted to the switch 39. However, since the switch 39 is composed of a P-channel MOS transistor, the switch is not turned off when the burst signal is not supplied; consequently, the transmission of the electric power to the receiving side load L is continued.

Thereby, in Embodiment 2, it is possible to configure the electric power supply control system 1 so as not to necessitate the control primary inductor nor the control secondary inductor. Therefore, it is possible to reduce the number of parts to be disposed in the non-contact surface, leading to realization of miniaturization.

As described above, the invention accomplished by the present inventors has been concretely explained based on the embodiments. However, it cannot be overemphasized that the present invention is not restricted to the embodiments, and it can be changed variously in the range which does not deviate from the gist.

The present invention is suitable for electronic equipment such as a mobile-phone, a printer, or the like, which is configured so as to supply electric power in a non-contact manner.

What is claimed is:

1. A power supply system comprising:
   a power transmitting unit operable to transmit electric power; and
   a power receiving unit operable to receive the electric power transmitted from the power transmitting unit, and to supply the electric power to a receiving side load,
   wherein the electric power transmitted from the power transmitting unit is received in a noncontact manner and supplied to the receiving side load coupled to the power receiving unit,
   wherein the power receiving unit generates a repeat of burst signals notifying that the electric power is short or surplus when the electric power of the receiving side load becomes short or surplus, and
   wherein the power transmitting unit controls the increase and decrease of the electric power to be transmitted to the power receiving unit, based on a length of intervals between the burst signals generated by the power receiving unit.

2. The power supply system according to claim 1,
   wherein the power receiving unit comprises:
   a power secondary inductor operable to generate electromotive force in response to a magnetic field change;
   a rectifier operable to convert into a DC (direct current) voltage an AC (alternating current) voltage induced across both ends of the power secondary inductor;
   a power-receiver voltage controller operable to measure a level of the voltage outputted from the rectifier and supplied to the receiving side load, and operable to output the burst signal after controlling an interval at which the burst signal is outputted depending on the measured voltage level; and
   a control primary inductor operable to be excited based on the burst signal generated by the power-receiver voltage controller, and
   wherein the power transmitting unit comprises:
   a power primary inductor operable to be excited based on an AC signal;
   a control secondary inductor operable to generate electromotive force in response to a magnetic field change of the control primary inductor; and
   a power-transmitter voltage controller operable to detect the burst signal from an AC signal induced across both ends of the control secondary inductor, operable to determine whether the electric power of the receiving side load is short or surplus by measuring an output interval from the detected burst signal, and operable to control the increase and decrease of the power to be transmitted to the power receiving unit by controlling the AC signal to be supplied to the power primary inductor.

3. The power supply system according to claim 2,
   wherein the power-receiver voltage controller comprises:
   a voltage detector operable to detect whether the voltage level outputted from the rectifier and supplied to the receiving side load is lower than a lower limit voltage threshold, or higher than an upper limit voltage threshold higher than the lower limit voltage threshold, or within the limits of a reference voltage between the lower limit voltage threshold and the upper limit voltage threshold;
   a burst interval setting unit operable to set up an interval at which the burst signal is outputted, based on the voltage level detected by the voltage detector; and
   a burst signal generator operable to generate and output the burst signal at the interval set up by the burst interval setting unit, and
   wherein the power-transmitter voltage controller comprises:
   a burst signal detector operable to detect transmission of the burst signal, based on an AC signal induced across both ends of the control secondary inductor;
   an interval measuring unit operable to measure an output interval of the burst signal detected by the burst signal detector; and
   a controller operable to determine whether the electric power of the receiving side load is short or surplus, based on the output interval of the burst signal measured by the interval measuring unit, operable to control the AC signal to be supplied to the power primary inductor by changing a period or the number of times to excite the power primary inductor.

4. The power supply system according to claim 1, wherein the power receiving unit comprises:

a power secondary inductor operable to generate electromotive force in response to a magnetic field change;

a rectifier operable to convert into a DC voltage an AC voltage induced across both ends of the power secondary inductor;

a power-receiver voltage controller operable to measure a level of the voltage outputted from the rectifier and supplied to the receiving side load, and operable to output the burst signal after controlling an interval at which the burst signal is outputted depending on the measured voltage level; and a switching unit coupled between one end of the power secondary inductor and the rectifier, and operable to change series impedance of the power secondary inductor by performing an ON/OFF operation based on the burst signal generated by the power-receiver voltage controller, and wherein the power transmitting unit comprises:

a power primary inductor operable to be excited based on an AC signal;

a filter unit operable to filter out a resonance frequency produced by the power primary inductor and a parasitic capacitance; and a power-transmitter voltage controller operable to detect the burst signal from a signal outputted from the filter unit, operable to determine whether the electric power of the receiving side load is short or surplus by measuring an output interval from the detected burst signal, and operable to control the increase and decrease of the power to be transmitted to the power receiving unit by controlling the AC signal to be supplied to the power primary inductor.

5. The power supply system according to claim 4, wherein the power-receiver voltage controller comprises:

a voltage detector operable to detect whether the voltage level outputted from the rectifier and supplied to the receiving side load is lower than a lower limit voltage threshold, or higher than an upper limit voltage threshold higher than the lower limit voltage threshold, or within the limits of a reference voltage between the lower limit voltage threshold and the upper limit voltage threshold;

a burst interval setting unit operable to set up an interval at which the burst signal is outputted, based on the voltage level detected by the voltage detector; and a burst signal generator operable to generate the burst signal at the interval set up by the burst interval setting unit, and operable to control motion of the switching unit, and wherein the power-transmitter voltage controller comprises:

a burst signal detector operable to detect a burst signal from a combined signal of the burst signal outputted from the filter unit and the excitation signal of the power primary inductor;

an interval measuring unit operable to measure an output interval of the burst signal detected by the burst signal detector; and a controller operable to determine whether the electric power of the receiving side load is short or surplus, based on the output interval of the burst signal measured by the interval measuring unit, and operable to control the AC signal to be supplied to the power primary inductor by changing a period or the number of times to excite the power primary inductor.

* * * * *